United States Patent [19]

Scapes

[11] 4,119,296

[45] Oct. 10, 1978

[54] VALVE WITH ENCLOSED SOFT TIP STEM

[75] Inventor: John N. Scapes, Schaumberg, Ill.

[73] Assignee: Gould Inc., Rolling Meadows, Ill.

[21] Appl. No.: 774,328

[22] Filed: Mar. 4, 1977

[51] Int. Cl.² .............................................. F16K 1/34
[52] U.S. Cl. .................................. 251/210; 251/332; 251/333
[58] Field of Search ................... 251/333, 210, 332

[56] References Cited

U.S. PATENT DOCUMENTS

| 934,620 | 9/1909 | Mueller | 251/210 X |
| 2,885,176 | 5/1959 | Bryant | 251/332 X |
| 3,290,002 | 12/1966 | Self | 251/210 |

FOREIGN PATENT DOCUMENTS

| 959,476 | 6/1964 | United Kingdom | 251/332 |

*Primary Examiner*—Arnold Rosenthal

*Attorney, Agent, or Firm*—Wegner, Stellman, McCord, Wiles & Wood

[57] ABSTRACT

A needle valve having a stem movably carried in a body defining a flow chamber with the tip of the stem being provided with a soft movable valve portion adapted to have seating engagement with an annular valve seat of a body port. The soft movable valve element may be defined by a tubular sleeve formed of a cold flowable material. A tubular retainer is slidably carried about the sleeve to prevent undesirable radial expansion of the sleeve as a result of cold flow and to direct the cold flowed material of the sleeve inwardly about a retainer portion of the stem disposed within the body port when the sleeve is in seating engagement with the body seat. The retainer is arranged to limit the adjustment of the stem to a maximum inward position wherein a major portion of the sleeve is cold flowed into the body port.

8 Claims, 3 Drawing Figures

VALVE WITH ENCLOSED SOFT TIP STEM

BACKGROUND OF THE INVENTION

1. Field of the Invention

This invention relates to valves and in particular to valves having soft movable seating members.

2. Description of the Prior Art

In U.S. Pat. No. 3,444,605 of Carl Bolling, which patent is owned by the assignee hereof, a needle-type valve is shown having a frustoconical movable seating portion adapted to engage a seat defined by the body of the valve through which one of the flow passages of the valve opens. The stem carrying the seating portion is threadedly adjustably carried by a bonnet portion of the body whereby suitable manipulation of a handle attached to the stem effects movement of the movable valve portion toward and from the seat to control fluid flow through the valve.

In U.S. Pat. No. 2,277,750 of Melvin Enquist, a valve is shown utilizing inner and outer metallic rings with an intermediate rubber ring vulcanized to the metal rings.

John Tannock, in U.S. Pat. No. 2,851,243, shows a jumper for domestic and industrial water taps, valves and the like having a head molded integrally to a stem formed of a plastic material, such as polyvinylchloride or polythene. The head is deformed radially outwardly into a surrounding space limited by an outer frustoconical edge portion of a constraining member.

In U.S. Pat. No. 3,290,002, Richard Self discloses a flow control valve having a Teflon sleeve 42, a portion of which flows into the bore of an outer retainer while being effectively encapsulated within the retainer at all times.

Myles Murray, in U.S. Pat. No. 3,326,521, shows a needle valve having a tip formed of rubber or other resilient composition with a metallic sleeve press fitted onto the valve body and extending about an outer portion of the tip.

In U.S. Pat. No. 3,698,427, Frank Baranowski, Jr. shows a valve wherein cold flow of the valve seat engaging portion of the valve element occurs so as to define the final configuration of the movable valve element.

A number of faucet patents show the use of rigid sleeves surrounding the deformable, movable seating portion of the valve. Thus, Albert Fuller, in U.S. Pat. No. 3,135, shows a faucet wherein the India rubber plug is encased in a metallic shield. Henry Mueller, in U.S. Pat. No. 950,186, shows a faucet wherein the Fuller ball is held in place between a rigid collar on the stem and a nut screwed onto the extremity of the stem. A tubular thimble formed of brass fits snugly about a flange on the ball to prevent undue expansion of the ball.

William Stewart, in U.S. Pat. No. 1,266,340, shows an expansion control device for elastic valves wherein the Fuller ball is enclosed in a metal cap designed to enclose the rear end as well as the sides of the ball. The cap is provided with a number of perforations permitting some expansion of the ball therethrough.

SUMMARY OF THE INVENTION

The present invention comprehends an improved valve structure wherein the soft tip of the valve stem defining the movable seating portion is formed of a cold flowable material which is caused to change its configuration repeatedly during the useful life of the valve from an original arrangement wherein the soft material is retained primarily fully within an annular retainer to a final arrangement wherein the material is cold flowed substantially from the retainer so that only a residual minor portion thereof remains within the retainer with a major portion of the soft material being disposed within the port of the valve body defining the valve seat.

In the illustrated embodiment, the soft seating portion of the movable valve element comprises a tubular sleeve formed of a cold flowable synthetic resin, such as Teflon, carried on a cylindrical mounting means on a carrier portion of the valve stem.

The sleeve is axially captured between a shoulder on the carrier and a shoulder on the cylindrical mounting portion.

The shoulder on the mounting portion defines an inner retainer which is adapted to move into the body port progressively as the sleeve is deformed by cold flow thereof in the continued use of the valve. Thus, the retainer has an outside diameter smaller than the diameter of the port whereby a portion of the sleeve may cold flow about the retainer within the port while yet the retainer continues to maintain the sleeve held captive on the cylindrical mounting means.

The invention further comprehends the use of an outer tubular retainer formed of a substantially noncold flowable material coaxially surrounding the sleeve and having an outer end arranged to extend coaxially about the carrier outwardly of the inwardly facing shoulder thereof at the outer end of the sleeve.

An inner end of the tubular retainer is arranged to abut the body coaxially about the seat when the carrier is moved inwardly to engage the sleeve with the seat. Thus, in the closed condition of the valve, the portion of the sleeve outwardly of the seat and inwardly of the carrier is fully enclosed by the tubular retainer.

In the illustrated embodiment, the outer end of the tubular retainer is slidably mounted on the carrier so that as the sleeve progressively cold flows into the port, the outer end of the tubular retainer may move slidably outwardly on the carrier and correspondingly permit the carrier to move progressively toward the seat until a major portion of the sleeve is cold flowed into the port with only a minor portion thereof remaining on the cylindrical mounting means inwardly of the carrier and outwardly of the seat.

The tubular retainer may have a preselected length arranged to cooperate with an outer shoulder on the carrier to limit the inward movement of the carrier so as to prevent a cold flow of the entire sleeve to within the port. In the limiting arrangement, the tubular retainer extends between the valve body circumjacent the valve seat to the carrier outer shoulder providing a positive rigid limiting means.

The cylindrical mounting means and retainer shoulder portion at the inner end thereof may be defined by a removable element having a threaded outer portion threadedly secured to the carrier permitting facilitated substitution of a replacement sleeve in the valve when desired.

Thus, the improved valve structure of the present invention provides a novel sleeve arrangement whereby different portions of the sleeve are progressively disposed to effect the seating engagement with the valve body seat to sealingly close the valve when desired. As more and more of the sleeve cold flows past the mounting means retainer portion into the port in the closed condition of the valve, the carrier is permitted to move closer and closer to the valve seat with the sleeve outer tubular retaining functioning not only to provide the desired enclosure of the sleeve on the mounting means outwardly of the valve seat, but also to provide an automatic limit to the cold flow adjustment of the valve.

Thus, the valve structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
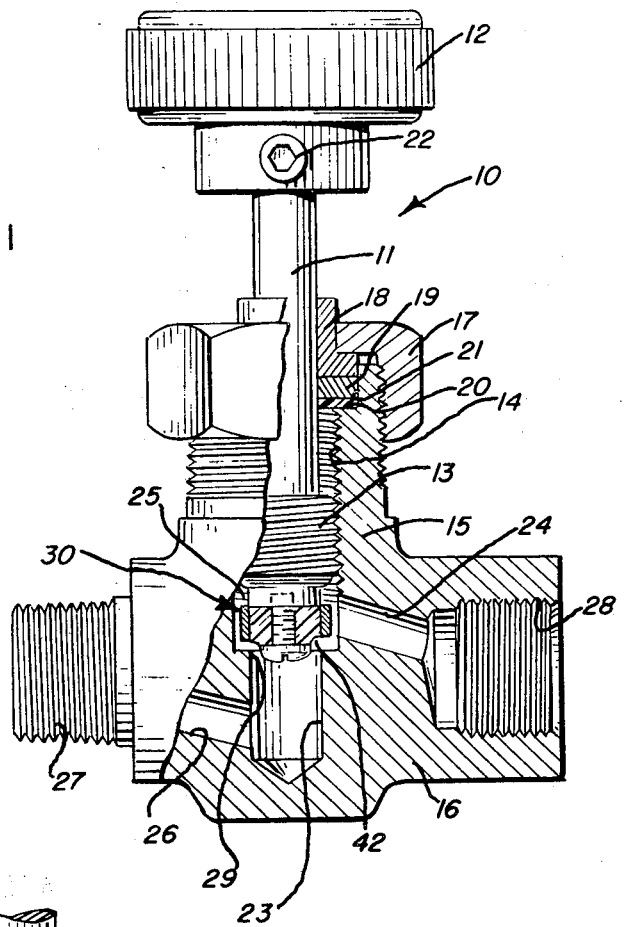
FIG. 1 is a side elevation of a valve structure emboydding the invention with a portion shown in vertical section to facilitate illustration of the invention.

In the exemplary embodiment of the invention as disclosed in the drawing, an improved valve structure 10 is illustratively disclosed as defining a needle valve having a stem 11 provided at its outer end with a manually operable handle 12. The stem includes a threaded portion 13 adapted to be adjustably threaded in a female threaded bore 14 of a mounting portion 15 of the valve body 16.

The stem may be sealingly retained to the body portion 15 by means of a nut 17 and cooperating sealing elements 18, 19 and 20. As shown in FIG. 1, the sealing elements may be received in a suitable recess 21 in the body portion 15.

Handle 12 may be removably secured to the outer end of the stem 11 by suitable means, such as set screw 22.

As further shown in FIG. 1, the valve body defines a pair of ports 23 and 24 opening to a valve chamber 25. Port 23 may be connected through a flow passage 26 to a threaded connector portion 27 of the valve body, and port 24 may be connected to a threaded connecting portion 28 thereof.

At its inner end, port 23 may define a valve seat 29 confronting the valve chamber 25 in spaced relationship to port 24. At its lower end, the valve stem is provided with a movable valve means 30 adapted to have selective seated engagement with valve seat 29 for selectively controlling fluid flow between ports 23 and 24.

Valve means 30 includes cylindrical carrier portion 31 defining the lower end of the valve stem 11. Carrier portion 31 may comprise a cylindrical lower end of the valve stem having an outer diameter slightly larger than the diameter of the valve seat 29.

A movable seating portion of the valve is defined by a tubular sleeve 32 extending axially inwardly from the carrier 31 and secured to the carrier by an element 33 having a cylindrical shank portion 34, an outer threaded portion 35 threaded coaxially to the carrier 31, and an inner retaining portion 36. Thus, as seen in FIG. 2, carrier 31 defines an axially inwardly facing shoulder 37 and retaining means portion 36 of element 33 defines an axially outwardly facing shoulder 38 between which the sleeve 32 is captured in coaxial extended relationship to the valve stem 11.

Figure 2:
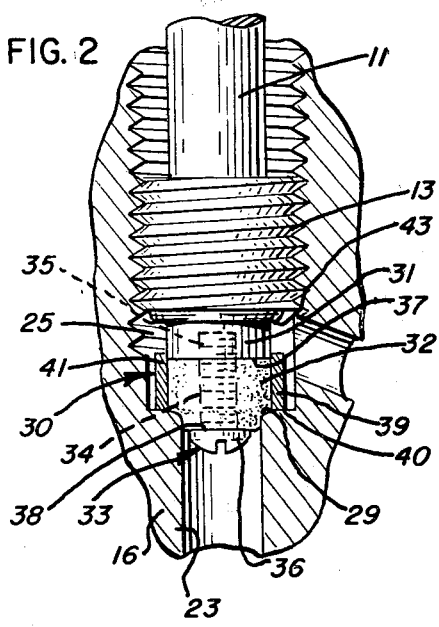
FIG. 2 is a fragmentary enlarged section showing the valve structure during an early stage in the cold flow adjustment of the valve.

Retaining portion 36 of element 33 effectively defines a head portion of the element having an outer diameter less than the diameter of port 23 so that the head 36 may be freely disposed within the port, as best seen in FIG. 2, in a closed condition of the valve. In such closed condition, the sleeve is urged against the valve seat 29 to provide the desired sealed closed arrangement of the valve.

The sleeve 32, defining the movable seating member of the valve, is preferably formed of a cold flowable material permitting the seating portion to cold flow in the seated arrangement of the valve to provide progressively different portions thereof to the valve seat in effecting the sealed closure of the valve. Illustratively, the sleeve may be formed of Teflon (a polytetrafluoroethylene resin). The present invention comprehends providing means for containing the cold flowable sleeve 32 radially outwardly of the retaining means shank portion 34 while permitting the sleeve to cold flow inwardly about the retaining means head 36 to provide an improved sealed relationship of the sleeve with the body seat and port, as shown in FIGS. 2 and 3.

Figure 3:
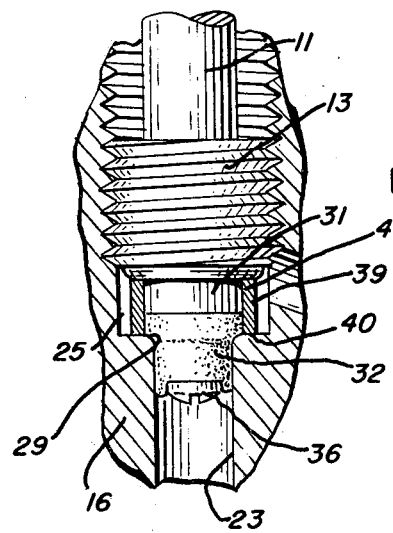
FIG. 3 is a cross section illustrating the arrangement of the valve structure upon reaching a limit in the cold flow adjustment thereof.

More specifically, the sleeve is enclosed in a tubular retainer 39 having an inner end 40 adapted to abut the valve body 16 about the valve seat 29 in the closed condition of the valve, as shown in FIGS. 2 and 3. An outer end 41 of the tubular retainer is adapted to slide on the carrier 31 as the carrier progressively moves toward the valve seat as a result of the cold flow displacement of the sleeve 32 inwardly about the retaining means head 36.

As shown in FIG. 1, the sleeve, in its original disposition, defines a frustoconical inner end surface 42 adapted to have initial seating engagement with the valve seat 29. As a result of cold flow of the sleeve, however, surface 42 moves to about the retaining means head 36 so that different portions of the sleeve are progressively brought into seating engagement with the seat 29 during successive closings of the valve wherein progressive cold flow of the sleeve may occur. As the sleeve is thus progressively cold flowed further and further inwardly about the head 36, carrier 31 is disposed closer and closer to the valve seat 29 with the outer end 41 of the tubular retainer 39 being displaced further and further axially outwardly along the carrier 31 to a limit position shown in FIG. 3 wherein the outer end 41 abuts an annular stop shoulder 43 on the stem at the outer end of the carrier. Thus, as shown in FIG. 3, in this limit condition, the tubular retainer 39 prevents further inward movement of the stem and, thus, limits the adjustable positioning of the sleeve 32 relative to the valve seat to a position wherein the major portion of the sleeve is disposed within the port 23 between the retaining means shank portion 34 and the wall of the port 23 inwardly of the valve seat 29. The remaining small portion of the sleeve outwardly of the valve seat is radially contained by the inner end of the tubular retainer 39 abutting the body radially outwardly of the valve seat and is caused to provide the desired positive sealed seating engagement with the valve seat. Thus, in the limiting position of FIG. 3, a substantial sealing engagement of the sleeve with the body both within the port and against the valve seat is effected notwithstanding the small portion of the sleeve remaining outwardly of the valve seat in the limit position.

When it is desired to replace the valve seat, as when it has cold flowed to the condition of FIG. 3, the stem is removed by suitable removal of nut 17 and seals 18, 19 and 20, permitting the stem to be threaded outwardly from the body portion 14. Threaded removal of the retaining means 33 may then be readily effected to remove the cold flowed sleeve and permit the substitution of a new sleeve having the original configuration illustrated in FIG. 1 with the tubular retainer being restored to the outer arrangement thereof about the newly installed sleeve, as shown in FIG. 1. Replacement of the assembly in the valve body may then be effected to restore the valve to the initial operating conditions of FIG. 1 and permit the valve to be operated through a further progressive adjustment cycle, as discussed above.

Thus, the present invention comprehends an improved valve structure wherein the soft seating portion of the movable valve element may progressively cold flow into the valve body port defining the valve seat so as to substantially extend the useful life of the movable valve element while providing at all times a positive sealed closure of the valve when arranged in the closed condition.

The foregoing disclosure of specific embodiments is illustrative of the broad inventive concepts comprehended by the invention.

I claim:

1. In a valve having a body defining a flow chamber having a first port defined by an annular seat and a second port, a carrier in said flow chamber, and operator means movably mounted in association with said body for moving said carrier selectively inwardly toward and outwardly from said seat, an improved movable valve means for controlling fluid flow through said flow chamber between said ports, said valve means comprising:

a tubular sleeve formed of a cold flowable material having an inner diameter smaller than the inner diameter of said seat and an outer diameter greater than the inner diameter of said seat;

cylindrical mounting means on said carrier defining an inwardly facing shoulder means;

retaining means coaxially carried on the inner end of said mounting means defining an annular, outwardly facing shoulder means abutting the inner end of said sleeve having an outer diameter substantially less than the outer diameter of said sleeve and the inner diameter of said seat and substantially greater than the inner diameter of said sleeve for effectively retaining the sleeve coaxially on said mounting means captured between said inwardly facing shoulder means of the mounting means and the outwardly facing shoulder means of the retaining means; and a tubular retainer formed of a substantially noncold flowing material coaxially surrounding said sleeve about said carrier cylindrical mounting means outwardly of said inwardly facing shoulder means, and an inner end arranged to abut said body coaxially about said seat when the carrier is moved inwardly to engage said sleeve with said seat, said sleeve being caused to cold flow between said seat and said retaining means in said first port as an incident of each forcible sealing closure of said valve and to have the incremental cold flowed portion remain extended about said shoulder means of the retaining means, said tubular retainer outer end being progressively incrementally urged outwardly about the carrier mounting means by the successive engagements of the retainer inner end with the body as the sleeve is progressively incrementally cold flowed inwardly from within the retainer to about said shoulder means of the retaining means, the axial length of the tubular retainer being substantially equal to the axial length of the sleeve prior to cold flow thereof and the axial length of said carrier cylindrical mounting means being at least approximately one-half the axial length of the tubular retainer whereby at least approximately one-half the sleeve may cold flow from within the tubular retainer before said tubular retainer outer end is disposed at the outer end of said mounting means.

2. The valve of claim 1 wherein said carrier and tubular retainer outer end define cooperating shoulders limiting the outward displacement of said retainer outer end on said carrier mounting means thereby limiting the inward movement of the movable valve means.

3. The valve of claim 1 wherein said sleeve is formed of polytetrafluoroethylene polymer.

4. The valve of claim 1 wherein said tubular retainer outwardly facing shoulder is fixedly disposed at a preselected spacing from said inwardly facing shoulder means of the carrier mounting means.

5. The valve of claim 1 wherein said sleeve has an original radial thickness prior to cold flow thereof approximately twice that of the spacing between said mounting means and the body within said port whereby the cold flowed portion of said sleeve in said port outwardly of said retaining means has a thickness approximately one-half of the original thickness thereof.

6. The valve of claim 1 wherein said tubular retainer is formed of metal.

7. The valve of claim 1 wherein said tubular retainer outer end is slidably carried on said carrier mounting means.

8. The valve of claim 1 wherein said tubular retainer has an inner diameter substantially equal to the outer diameter of said carrier mounting means.

* * * * *